Jan. 3, 1956 R. G. PIETY 2,729,783
METHOD OF AND APPARATUS FOR ELECTRICAL WELL LOGGING
Filed Feb. 6, 1950 3 Sheets-Sheet 1

INVENTOR.
R. G. PIETY
BY Hudson & Young
ATTORNEYS

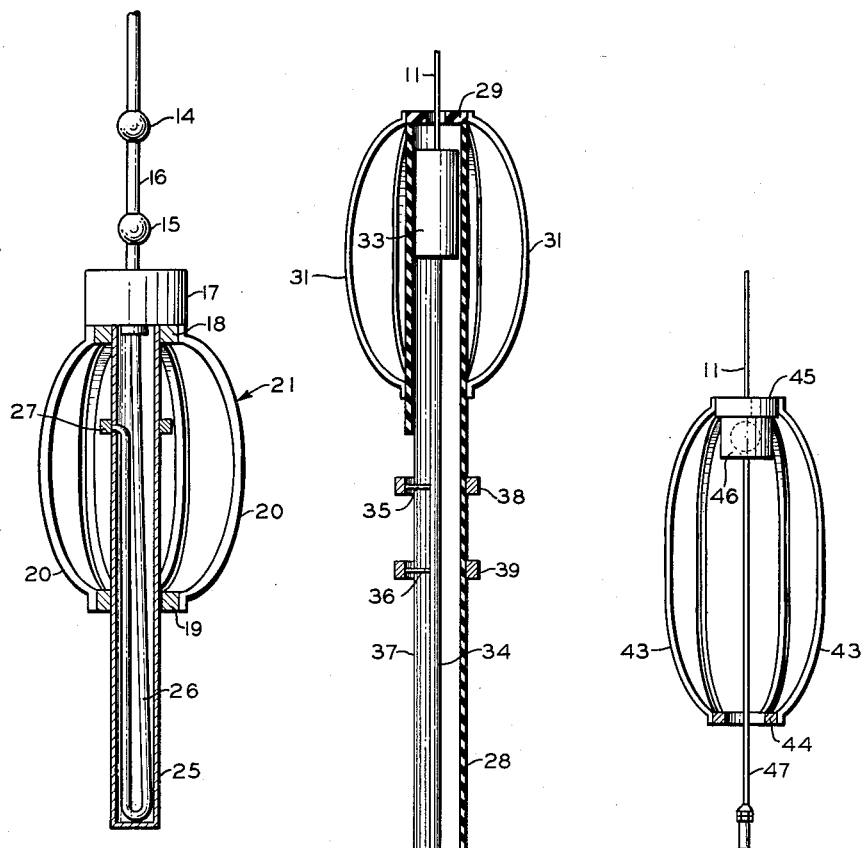
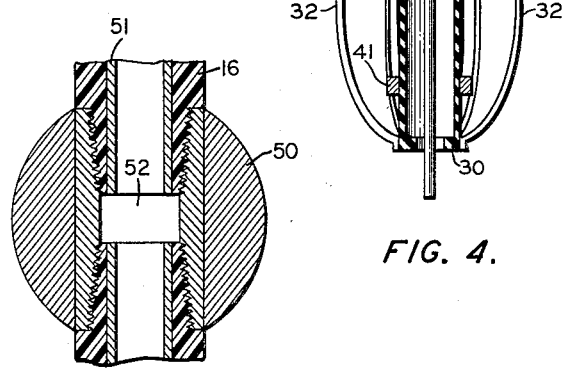

United States Patent Office 2,729,783
Patented Jan. 3, 1956

2,729,783

METHOD OF AND APPARATUS FOR ELECTRICAL WELL LOGGING

Raymond G. Piety, Bartlesville, Okla., assignor to Phillips Petroleum Company, a corporation of Delaware Application February 6, 1950, Serial No. 142,577

6 Claims. (Cl. 324—1)

This invention relates to electrical well logging. In another aspect, it relates to electrical well logging wherein the spacing between the logging electrodes may be varied in a continuous manner at preselected locations within the well bore. In still another aspect, it relates to a well logging system in which one electrode spacing may be utilized while moving the logging instrument downwardly in the well bore, a different spacing being provided as the instrument is moved upwardly in the well bore.

Heretofore, in electrical well logging, an alternating current has been applied between a generating electrode disposed at a predetermined depth in the well and a ground plate or other suitable ground connection disposed at the surface of the well. A plurality of pickup electrodes are also mounted within the well at predetermined spacings from the generating electrode. In making an electrical log, the potential difference between each pickup electrode and a distant ground is measured individually or the potential difference between the pickup electrodes is measured. The potential of any electrode in the system will be equal to the potential of some closed surface containing the current source electrode. This closed surface will enclose the current source. The potential difference between any two such surfaces divided by the total current from the current source which they enclose measures the resistance between the two surfaces. If the geometry of the system is sufficiently simple it is possible to relate this resistance to the resistivities of the materials surrounding the electrodes from the theory of electricity. The space between equipotential surfaces will be called a shell. In the ideal case of a homogeneous medium, the shell would be spherical and the two electrode logs would provide an accurate indication of resistivity of the material within the spherical shell. However, in a practical case, the shell is not spherical due to varying resistivities of the formations adjoining the well bore, the drilling mud or other fluid within the well bore, and the portion of the formation immediately adjacent the well bore which is permeated, to some extent, by the drilling fluid. In addition, the formations are almost universally non-homogeneous. As a result, there is a resistivity variation between adjoining strata and even between different parts of the same stratum.

Accordingly, heretofore, the evaluation of electrical well logs has been performed on an empirical basis, it being assumed with considerable success that abrupt changes in the logging potential indicate changes in the type of formation encountered. In an effort to improve the qualitative nature of electrical well logging, it has been proposed to utilize a plurality of pickup electrodes. It is known that the distance between the pickup electrode and generating electrode determines the effective radius of the shell whose average resistivity is measured, although the shell itself may be of very irregular form, which form cannot be determined by present methods. However, when a number of pickup electrodes are utilized with different spacings, and the resistivity of the drilling fluid together with the bore diameter are allowed for, a curve may be obtained which is termed a resistivity-departure curve. By comparing this curve with standard curves representing predetermined types of formations, valuable information may be obtained concerning the nature of the strata adjoining the well bore. In this connection, it will be noted that the potential at each pickup electrode, after taking into consideration the mud resistivity and bore diameter, provides a single point on the resistivity-departure curve. The nature of the curve between the points thus obtained may be quite accurately approximated if the points lie upon a smooth mathematical curve. However, this is not the case with a practical well logging system and the number of points obtained with practical electrode configurations preclude, in many instances, the accurate determination of the resistivity-departure curve.

This procedure for constructing resistivity-departure curves is fully described in an article by Doll, Legrand and Stratton entitled "True resistivity determination from the electric log—its application to log analysis," appearing in The Oil and Gas Journal, September 20, 1947, pages 297–310. In the examples therein illustrated the ratio of the apparent formation resistivity to the resistivity of the drilling mud is plotted against the ratio of the electrode spacing to the diameter of the bore hole. The illustrated curves in Figures 7–10, 12 and 14 are for the so-called "two-electrode logging system" which is known as a "normal" electrode system. In such a normal logging system a single current generating electrode is positioned in the bore hole and a single pickup electrode is positioned in the bore hole in spaced relation with the generating electrode. A source of electrical current is applied to the generating electrode and the potential on the pickup electrode, taken with respect to a point of reference potential, is measured. In order to plot the described resistivity-departure curves a plurality of potential readings are necessary with different spacings between the generating and pickup electrodes. In accordance with the present invention apparatus is provided whereby these potential values can be obtained in a simplified manner. To this end a cage assembly comprising the current generating electrode is held at a fixed location in a bore hole and a pickup electrode is moved through the bore hole relative to the generating electrode. By recording the potential on the pickup electrode as this pickup electrode is moved relative to the generating electrode a plurality of potential readings are obtained at different spacings for use in plotting the resistivity-departure curves.

The same general type of information is obtainable from a so-called "three electrode log" in which the potential differences between preselected pairs of pickup electrodes are recorded. Each such log provides, when corrected for bore diameter and fluid resistivity, the average resistivity of the formation between two shells of irregular and unknown configuration, one pickup electrode lying on the outer shell and the other pickup electrode lying on the inner shell. These logging potentials, that is, the various potentials produced between different selected pairs of electrodes, may each be utilized in the manner previously indicated to provide a single point upon a resistivity-departure curve which may be compared with standard curves to obtain valuable information concerning the nature and extent of the strata adjoining the well bore.

It is an object of my invention to provide an improved means for obtaining resistivity-departure curves in which the data are obtained in a continuous manner, rather than as a collection of isolated points.

It is a further object to provide apparatus for utilizing different electrode spacings while the logging instrument is entering and leaving the well bore, respectively, thereby to double the information obtainable from previous types of electrical logging instruments.

It is a still further object to provide apparatus for continuously varying the electrode spacing at preselected portions of the well bore.

It is a still further object to provide apparatus which is simple in construction, reliable in operation and utilizes a minimum number of moving parts.

Various other objects, advantages and features of the invention will become apparent from the following detailed description taken in conjunction with the accompanying drawings, in which.

Figure 7:
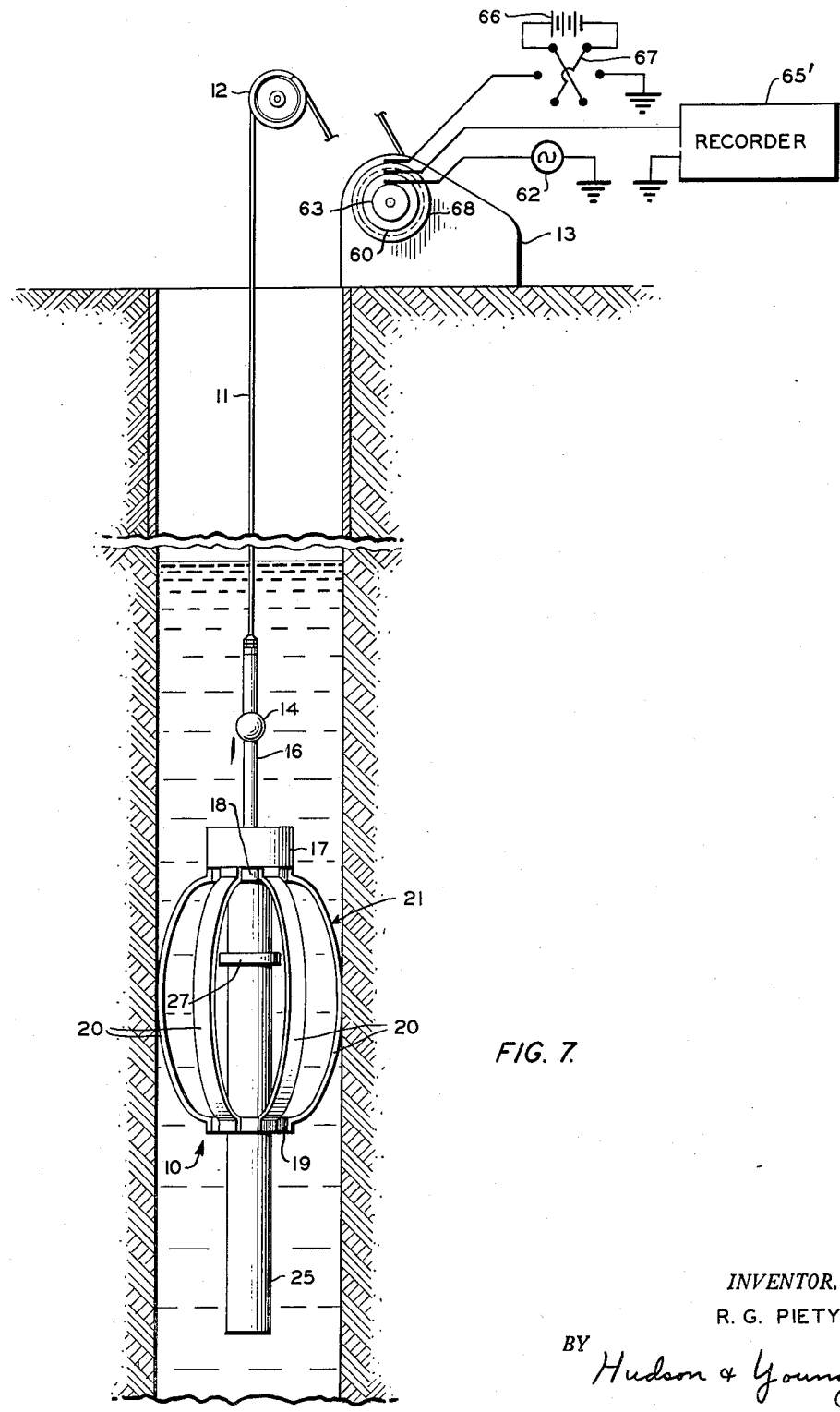

Figures 3, 4, and 5 are vertical, sectional views of modified types of logging instruments constructed in accordance with my invention;

Figure 6 is an enlarged vertical sectional view of one of the electrode assemblies; and Figure 7 is a vertical sectional view of a modified form of the logging instrument.

Figures 1, 2:
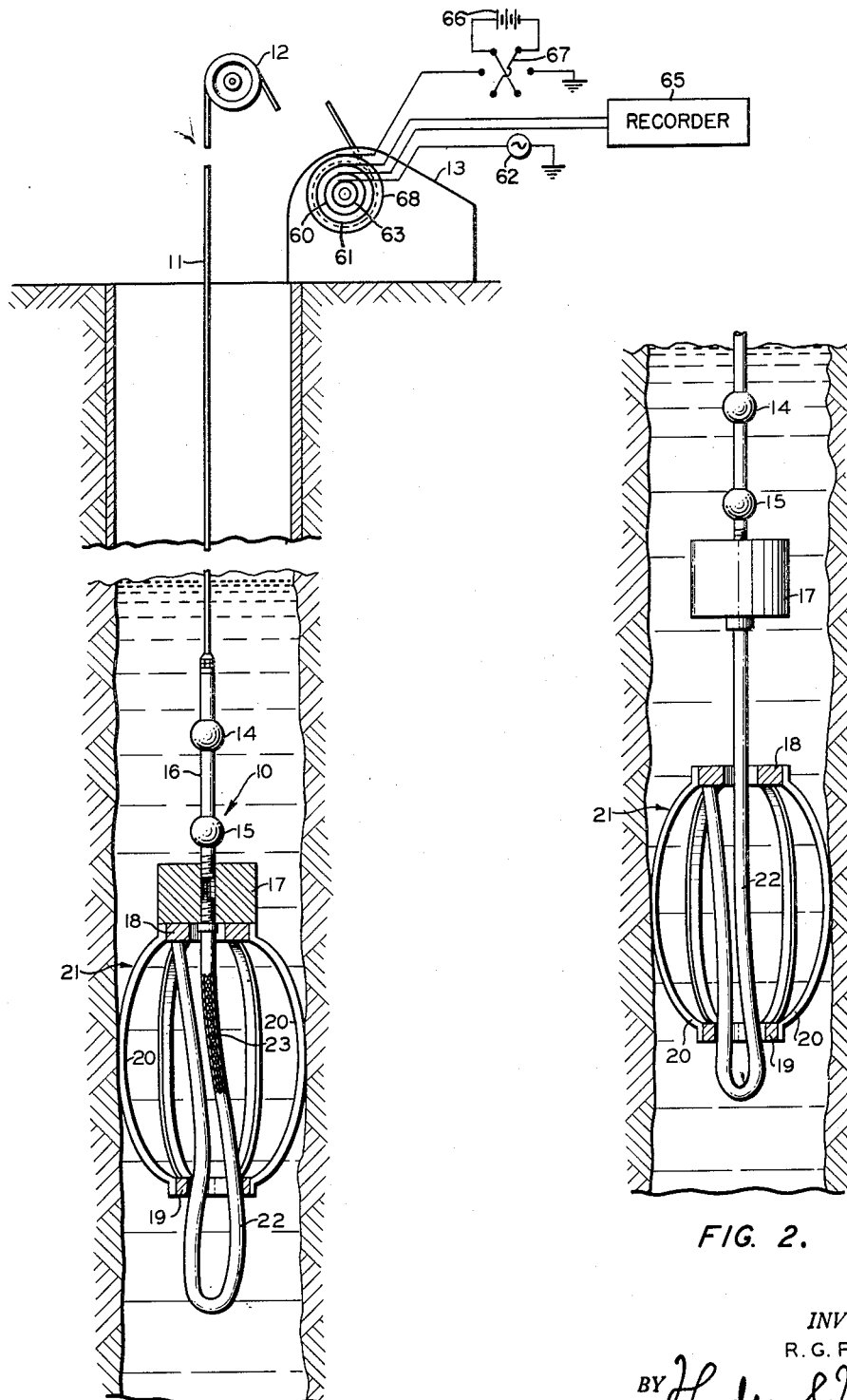
Figure 1 is a vertical, sectional view of my novel logging instrument, as it descends into a well bore.
Figure 2 is a view of the logging instrument of Figure 1 at a region where the electrode spacing is continuously changing.

Referring now to Figure 1, a logging instrument 10 is suspended in a well bore by a cable 11 which is extended over a pulley 12 to a windlass 13, thus permitting the logging instrument to be raised and lowered within the well bore. The logging instrument 10 includes pickup electrodes 14, 15 carried by an insulating supporting assembly 16. The structure of electrodes 14, 15 is shown in Figure 6. Each electrode includes a spherical shaped metallic element 50 which is threaded onto supporting assembly 16, which in turn is bonded to tubular support 51. An opening 52 is formed within each of the electrodes by the termination of assembly 16 and support 51 short of the center of the electrode so that electrical leads can be connected to each electrode, these leads extending upwardly through tubular support 51 to the surface apparatus through cable 11 and slip rings 60, 61 on windlass 13 to a suitable potential recorder 65. Electrodes 14 and 15 are essentially of the form described in the copending application of Fred L. McMillan, Jr., filed March 24, 1949, Serial No. 88,787, entitled Apparatus for Electrical Well Logging, now Patent No. 2,653,294. The lower end of the assembly 16 is screw threaded within a weight 17 which, during the descent of the instrument into the well, rests upon a plate 18. This plate, together with a plate 19 and spring strips 20, defines a cage structure 21. The weight 17 is also attached to a cable section 22 which, in turn, is secured to the plate 18 and forms a loop which extends downwardly through a suitable opening in plate 19. The cable section 22 may advantageously incorporate a beaded core 23 of conductive material which is electrically connected to plate 18 and the cage structure at one end thereof and to suitable surface apparatus at the other end thereof. The beaded core 23 also serves the function of preventing tangling of the cable and maintaining it in a looped arrangement.

In carrying out the invention, the cage structure 21 represents the generating electrode, and current is fed thereto from a suitable current source 62, one terminal of which is grounded, at the surface through slip ring 63 and a suitable conductor in cable 11 and thence through the beaded core 23. If desired, however, the generating electrode may be attached to the cage and insulated therefrom without departing from the spirit and scope of the invention. The cage 21 is so constructed that the strips 20 yieldingly engage the sides of the well bore and resist movement of the cage assembly either in an upward or a downward direction. As the instrument is lowered in the well bore by paying out cable 11, the weight 17 rests on the plate 18 of the cage and moves it downwardly through the well bore. During this downward travel, an electrical log may be made utilizing the cage as the generating electrode and the electrodes 14, 15 as pickup electrodes; the potentials on electrodes 14, 15, being recorded on recorder 65. It will be observed that a predetermined spacing is maintained between the cage and electrodes during such downward travel of the instrument. When the cable 11 is raised, the weight 17 moves upwardly away from plate 18, as illustrated in Figure 2, until the slack in cable section 22 is taken up. While the slack is being taken up in this manner, the cage remains in a stationary position within the well bore due to the action of spring strips 20. As the upward movement of the cable is continued, the cage assembly is moved upwardly through the well bore by the cable. During this upward movement of the cable, a second electrical log may be made wherein the spacing between the generating electrode or cage 21 and pickup electrodes 14, 15 is substantially greater, the increase in distance between these parts being determined by the length of the loop or slack portion formed by cable section 22. As a result, entirely different electrode spacings are obtained as the instrument is raised within the well bore, as compared with the electrode spacings when the instrument is lowered into the well bore. This doubles the amount of information obtainable from a given logging system with a preselected number of electrodes.

At regions of the well bore which are of particular interest, an electrical log is made during the period when the spacing between the electrodes is being continuously varied. To this end, the cage assembly is lowered to the desired depth in the manner previously described and then the cable is raised until the slack in cable section 22 is taken up, the cage remaining stationary in the bore during this interval. During this period, the spacing between the cage or generating electrode 21 and pickup electrodes 14, 15 continuously increases, thus providing an electrical log wherein the effective radius of the zone in which the resistivity is measured is progressively increased in a continuous manner. This provides data for plotting a continuous resistivity-departure curve for the region of interest. In similar fashion, if the instrument is originally positioned below the zone at which the continuous variation of electrode spacing is desired, the cage is raised within the bore by taking up cable 11 until the cage is positioned at the region of interest. Thereupon, the cable is lowered until the weight 17 engages plate 18. During this period, the spacing between the cage or generating electrode 21 and pickup electrodes 14, 15 is continuously decreased and the electrical log shows the average resistivity of a zone of the formation whose effective radius is continuously decreasing, thus enabling a continuous resistivity-departure curve to be plotted.

In the apparatus of Figures 1 and 2, difficulties may be encountered in lowering the weight 17 in the manner just described, as the cable section 22 may not accurately enter the opening in plate 19. This difficulty is obviated in the modification of Figure 3, in which parts similar to those already described are indicated by like reference characters. In this modification, a closed tube 25 is mounted within the openings in plates 18, 19 and a cable section 26 has one end thereof connected to weight 17 and its other end connected to a collar 27 on the tube 25. In this manner, the cable is positively retained within the tube 25 and tangling thereof either with itself or with other parts of the cage is effectively eliminated.

The apparatus illustrated in Figure 7 is employed for making a two-electrode log. This apparatus is identical to that of Figures 1 and 3 except that only a single pickup electrode 14 is mounted on cable 16 and the potential at electrode 14 with respect to ground is recorded at the surface on recorder 65'.

In the modification of Figure 4, a tube 28 provided with a top plate 29 and a bottom plate 30 has bowed spring strips 31 at its upper end and similar strips 32 at its lower end to yieldingly engage the walls of the well bore and resist upward or downward movement of the assembly. The cable 11 is attached to a weight 33 which is movable vertically within the tube 28 constructed of an electrically insulating material. Attached to the lower end of weight 33 is a rod 34 having a pair of radial arms 35 and 36 which extend through a slot 37 in tube 28 and support annular electrodes 38, 39 for slidable movement along the outer surface of the tube. A collar 40 is mounted within the tube and carried by rod 34 at a position spaced a predetermined distance above plate 30. A stationary electrode 41 is mounted at the lower end of tube 28 and this electrode, together with electrodes 35, 36 is connected with the surface apparatus by suitable conductors, not shown, extending through the cable 11. In this modification, electrode 41 is the generating electrode while electrodes 38, 39 are the pickup electrodes. As the cable 11 is lowered, the weight 33 descends within tube 28 until collar 40 engages plate 30. Thereupon, the weight 33 forces the cage assembly downwardly within the well bore and an electric log is made with a predetermined spacing between generating electrode 41 and pickup electrodes 38, 39. When the instrument is raised, the weight 33 moves upwardly within tube 28 until it engages plate 29 and raises the entire electrode assembly in the bore hole. Accordingly, a second log may be made with a greater spacing between generating electrode 41 and pickup electrodes 38, 39 as the instrument is raised within the well. Furthermore, at any desired location, the weight 33, rod 34 and collar 40 may be moved upwardly and downwardly within tube 28 between their respective limits of travel to permit a continuous variation of electrode spacing.

In the modification of Figure 5, a plurality of spring strips 43 are mounted between a bottom plate 44 and an upper support plate 45 which is attached to the cable 11, these springs resisting upward or downward movement of the instrument within the well bore in the manner previously described. Mounted on the plate 45 is a small direct current motor-driven winch 46 from which a cable 47 may be extended. Motor-driven winch 46 is operated from voltage source 66 located at the surface in Figure 1. Voltage source 66, one terminal of which is grounded is applied to winch 46 through a reversing switch 67, slip ring 68, and a suitable conductor positioned in cable 11. The cable 47 carries an assembly consisting of a rod 16 and electrodes 14, 15 of the same description as those shown by Figure 6, the lower end of the rod 16 carrying a weight 48. Preferably, the cage defined by the spring strips and plates functions as the generating electrode and the electrodes 14, 15 are the pickup electrodes. It will be apparent that the spacing between pickup electrodes 14, 15 and the cage may be varied as desired at any part of the well by suitable operation of the motor-driven winch 46. The electrodes together with the control leads for the winch are connected with the surface by suitable electrodes, not shown, forming a part of cable 47 and cable 11. With this modification, it will be apparent that the electrode spacing may be continuously varied to a large extent at any predetermined location within the well bore. Furthermore, as the unit is raised or lowered in the well, any desired fixed spacing between the electrodes may be maintained by moving them to a desired position by the motor-driven winch. The block 48 is, of course, of sufficient weight that it will pull the cage assembly downwardly in the bore against the sliding friction exerted by the spring strips 43 upon the side walls. It will be noted that the vertical position of the cage in the well bore is always determined, in this modification, by the amount of cable 11 which is payed out while the electrode spacing is always controlled by the amount of cable 47 payed out by winch 46.

While the invention has been described in connection with a present, preferred embodiment thereof, it is to be understood that this description is illustrative only and is not intended to limit the invention, the scope of which is defined by the appended claims.

I claim:
1. Apparatus for electrical well logging which comprises, in combination, a cage forming a first electrode adapted to contact well fluid when the cage is lowered into a well bore, said cage including a plurality of strips of resilient material so arranged as to engage the walls of a well bore to resist movement of the cage in a longitudinal direction therethrough, a cable attached at its lower end to said cage for suspending said cage in a well bore, a weight carried by said cable at a position above its point of attachment to said cage, the portion of said cable between said cage and said weight being sufficiently flexible to allow said weight to engage said cage whereby the weight forces the cage downward through the well bore, second and third electrodes carried by said cable above said weight in spaced relation with one another and with said weight, said second and third electrodes being electrically insulated from one another and from said cage through said cable, said second and third electrodes each being adapted to contact well fluid in the bore hole.

2. Apparatus in accordance with claim 1 in which the cage includes a pair of vertically spaced annular plates, and a hollow tube fitted within the openings of said plates for receiving said lower portion of said cable between said cage and said weight when said weight is in engagement with said cage.

3. The combination in accordance with claim 1 further comprising a source of electrical energy applied between said cage and a point of reference potential, and means to measure the potential difference between said second and third electrodes.

4. Apparatus for electrical well logging which comprises, in combination, an electrical well logging instrument adapted to be lowered and raised in a well bore, a cable attached at one end of said instrument for lowering and raising said instrument in a well bore, said instrument including means for resisting longitudinal movement thereof through the well bore whereby said instrument normally remains stationary in the well bore, a weight assembly attached to said cable at a point thereon spaced from the end of said cable which is attached to said instrument whereby said weight is adapted to engage said instrument to force it downwardly through the well bore against the force of said resisting means, the portion of said cable between said instrument and said weight being sufficiently flexible to allow said weight to engage said instrument, said cable serving to raise said instrument upwardly through the well bore against the force of said resisting means, a first electrode attached to said instrument so as to make electrical contact with fluids in the well bore, and a second electrode attached to said cable at a point thereon spaced from the end of said cable which is attached to said instrument whereby the spacing between said first and second electrodes varies with upward and downward movement of said instrument in the well bore, said second electrode being electrically insulated from said first electrode through said cable but in electrical contact with fluids in the well bore.

5. The combination in accordance with claim 4 further comprising a third electrode attached to said cable at a point thereon spaced from said second electrode and from the end of said cable which is attached to said instrument, said third electrode being electrically insulated from said first and second electrodes through said cable but in electrical contact with fluids in the well bore.

6. The combination in accordance with claim 5 further comprising a source of electrical energy applied between said first electrode and a point of reference potential, and means to measure the potential difference between said second and third electrodes.

References Cited in the file of this patent
UNITED STATES PATENTS

| | | |
|---|---|---|
| 2,192,404 | Jakosky | Mar. 5, 1940 |
| 2,393,009 | Chun | Jan. 15, 1946 |
| 2,414,194 | Ennis | Jan. 14, 1947 |